(12) United States Patent
Kyllonen et al.

(10) Patent No.: US 10,607,188 B2
(45) Date of Patent: Mar. 31, 2020

(54) SYSTEMS AND METHODS FOR ASSESSING STRUCTURED INTERVIEW RESPONSES

(71) Applicant: Educational Testing Service, Princeton, NJ (US)

(72) Inventors: Patrick Charles Kyllonen, Lawrenceville, NJ (US); Lei Chen, Pennington, NJ (US); Michelle Paulette Martin, Princeton Junction, NJ (US); Isaac Bejar, Hamilton, NJ (US); Chee Wee Leong, Levittown, PA (US); Joanna Gorin, Newtown, PA (US); David Michael Williamson, Yardley, PA (US)

(73) Assignee: Educational Testing Service, Princeton, NJ (US)

( * ) Notice: Subject to any disclaimer, the term of this patent is extended or adjusted under 35 U.S.C. 154(b) by 660 days.

(21) Appl. No.: 14/667,006

(22) Filed: Mar. 24, 2015

(65) Prior Publication Data

US 2015/0269529 A1 Sep. 24, 2015

Related U.S. Application Data

(60) Provisional application No. 61/969,493, filed on Mar. 24, 2014.

(51) Int. Cl.
*G06Q 10/10* (2012.01)
*G10L 15/26* (2006.01)
*G10L 25/63* (2013.01)

(52) U.S. Cl.
CPC .......... *G06Q 10/1053* (2013.01); *G10L 15/26* (2013.01); *G10L 25/63* (2013.01)

(58) Field of Classification Search
CPC ....... G06N 99/005; G10L 15/22; G10L 15/32; G06F 19/26; G06F 3/017; G06F 17/30032
(Continued)

(56) References Cited

U.S. PATENT DOCUMENTS 9,009,045 B1 * 4/2015 Larsen ............... G06Q 10/1053
704/243
2006/0271526 A1 * 11/2006 Charnock .............. G06Q 30/02
(Continued)

OTHER PUBLICATIONS

Baur, Tobias, Damian, Ionut, Gebhard, Patrick, Porayska-Pomsta, Kaska, Andre, Elisabeth; A Job Interview Simulation: Social Cue-based Interaction with a Virtual Character; IEEE International Conference on Social Computing; pp. 220-227; 2013.
(Continued)

*Primary Examiner* — Mehmet Yesildag
(74) *Attorney, Agent, or Firm* — Jones Day (57) ABSTRACT

Systems and methods described herein utilize supervised machine learning to generate a model for scoring interview responses. The system may access a training response, which in one embodiment is an audiovisual recording of a person responding to an interview question. The training response may have an assigned human-determined score. The system may extract at least one delivery feature and at least one content feature from the audiovisual recording of the training response, and use the extracted features and the human-determined score to train a response scoring model for scoring interview responses. The response scoring model may be configured based on the training to automatically assign scores to audiovisual recordings of interview responses. The scores for interview responses may be used by interviewers to assess candidates.

23 Claims, 6 Drawing Sheets

(58) Field of Classification Search
USPC .................. 345/156; 434/236, 350; 600/300; 715/764
See application file for complete search history.

(56) References Cited

U.S. PATENT DOCUMENTS

| | | | | |
|---|---|---|---|---|
| 2007/0078642 | A1* | 4/2007 | Weng | G10L 15/1822 704/4 |
| 2008/0306811 | A1* | 12/2008 | Goldman | G06Q 10/063112 705/7.14 |
| 2009/0318773 | A1* | 12/2009 | Jung | A61B 5/04009 600/300 |
| 2010/0161503 | A1* | 6/2010 | Foster | G06Q 10/10 705/321 |
| 2013/0212501 | A1* | 8/2013 | Anderson | G06F 3/0484 715/764 |
| 2013/0266925 | A1* | 10/2013 | Nunamaker, Jr. | G06N 20/00 434/362 |
| 2014/0191939 | A1* | 7/2014 | Penn | G06F 3/015 345/156 |
| 2014/0212853 | A1* | 7/2014 | Divakaran | G09B 19/00 434/236 |
| 2014/0317009 | A1* | 10/2014 | Bilodeau | G06Q 10/1053 705/321 |
| 2014/0344175 | A1* | 11/2014 | Kapoor | G09B 7/02 705/321 |
| 2015/0099255 | A1* | 4/2015 | Aslan | G09B 5/08 434/350 |
| 2015/0248608 | A1* | 9/2015 | Higgins | G06N 3/04 706/16 |

OTHER PUBLICATIONS

Hoque, Mohammed; My Automated Conversation Helper (MACH): Helping People Improve Social Skills; Proceedings of the 14th ACM International Conference on Multimodal Interaction; pp. 313-316; 2012.

Nguyen, Laurent Son, Marcos-Ramiro, Alvaro, Romera, Marta Marron, Gatica-Perez, Daniel; Multimodal Analysis of Body Communication Cues in Employment Interviews; Proceedings of the 15th ACM International Conference on Multimodal Interaction; pp. 437-444; 2013.

Nguyen, Laurent Son, Frauendorfer, Denise, Schmid Mast, Marianne, Gatica-Perez, Daniel; Hire Me: Computational Inference of Hirability in Employment Interviews Based on Nonverbal Behavior; IEEE Transactions on Multimedia, 16(4); pp. 1018-1031; Jun. 2014.

* cited by examiner

SYSTEMS AND METHODS FOR ASSESSING STRUCTURED INTERVIEW RESPONSES

CROSS-REFERENCE TO RELATED APPLICATIONS

The present application claims the benefit of U.S. Provisional Application Ser. No. 61/969,493, entitled "Using Multimodal Signal Processing to Automatically Score Video-Based Employment Structured Interviews," filed Mar. 24, 2014, the entirety of which is hereby incorporated by reference.

FIELD

This disclosure is related generally to automated scoring and more particularly to automated scoring of interviews based on audiovisual recordings of interview responses.

BACKGROUND

Interviews are often integral to any placement process, such as for employment, college admission, etc. Unfortunately, interviews are typically labor intensive and time consuming as they are usually conducted and evaluated by humans. In situations where several positions need to be filled or where each candidate must be interviewed by several interviewers, the time and cost associated with interviews could be significant. In some cases, the demands may even be prohibitive; resulting in employers being forced to limit the number of candidates interviewed or reduce the number of interviewers to less than what is desired. In addition, candidates for the same position are commonly evaluated by different sets of interviewers under their individual subjective criteria and biases. Consequently, when making hiring decisions, hiring managers often face the difficult task of comparing candidates based on opinions of different people. This may sometimes result, for example, in a less qualified or less desirable candidate being hired simply because he was interviewed by a more lenient interviewer.

SUMMARY

The systems and methods described herein provide robust means to systematically and automatically evaluate interview performances. In some embodiments, interviews are recorded as audiovisual data that includes both video and audio (e.g., in formats such as MPEG4, AVI, WMV, MOV, etc.). The audiovisual data may be analyzed by a computer processing system to extract both content features and delivery features. The system transforms the content features and delivery features into a score or a series of scores that represent a quantitative characterization of an interviewee's degree of competency in one or more behavior dimensions, such as composure or professionalism. The score(s) could then be used to make hiring, promotional, developmental recommendations.

Machine-based evaluations can provide several advantages over human evaluations. Machine-based systems with computer processing systems for automated processing are more capable at detecting nuances, such as slight body movements and prosody, which may be difficult for some human interviewers to discern. Moreover, such machine-based evaluation can detect and evaluate several different interview features even when they are being simultaneously expressed. For example, at a given instant, an interviewee may be simultaneously answering a question, changing his tone, moving his arms, shifting his feet, leaning forward, switching his gaze, etc. The fact that those features are being simultaneously expressed would pose no problem for a machine-based evaluation system, but a human interviewer might overlook some features. Moreover, a human interviewer is susceptible to forgetfulness and cognitive biases, such as confirmation bias, whereas machines are not. Machine-based evaluations also provide a level of consistency that cannot be matched by human interviewers. Candidates evaluated by the same system would consistently be evaluated based on the same criteria. Human interviewers, on the other hand, each have his/her own evaluation criteria and/or biases, and a lack of consistency in evaluation is expected from one human interviewer or evaluator to another. Even the same interviewer cannot guarantee consistency, since his/her evaluations may vary depending on a variety of factors, such as the time of day, fatigue, stress, mood, etc. Thus, machine-based evaluations can provide a level of consistency and reliability that cannot be matched by humans.

Described herein are exemplary embodiments of computer-implemented methods and systems for generating a model for scoring interview responses. A processing system may access a training response, which may be an audiovisual recording of a person responding to an interview question, as well as a human-determined score assigned to that training response. The system may extract at least one delivery feature from the audiovisual recording of the training response. The system may also obtain a transcription of the training response using automated speed recognition and extracting at least one content feature from the transcription. The system may then train a response scoring model for scoring interview responses using at least the delivery feature, the content feature, and the human-determined score. The system may configure the response scoring model based on the training to automatically assign scores to audiovisual recordings of interview responses. The assigned scores may be used for candidacy assessment.

Further described herein are exemplary embodiments of computer-implemented methods and systems for scoring interview responses. A processing system may access an interview response, which may be an audiovisual recording of a candidate responding to an interview question. The system may extract at least one delivery feature from the audiovisual recording of the interview response. The system may obtain a transcription of the interview response using, e.g., automated speech recognition. Then, the system may extract at least one content feature from the transcription. The system may apply a response scoring model to the delivery feature and the content feature, thereby generating a response score corresponding to the interview response. The response score may be used to assess the candidate. For example, the score may assist an employer/school determine whether the audiovisual recording of the candidate's interview should be reviewed by a human, whether additional interviews are warranted, whether an offer should be extended to the candidate, and/or the like.

Exemplary systems comprising a computer processing system and a memory for carrying out the method are also described. Non-transitory computer readable media having instructions adapted to cause a processing system to execute the exemplary approaches are also described.

DETAILED DESCRIPTION

Systems and methods described herein allow machines to automatically determine how well a candidate performed during an interview. The systems and methods can be implemented using any suitable combination of hardware, software, and/or firmware using algorithms implemented in any suitable programming language such that a processing system of a computer system is configured to carry out the exemplary approaches described herein.

Figure 1:
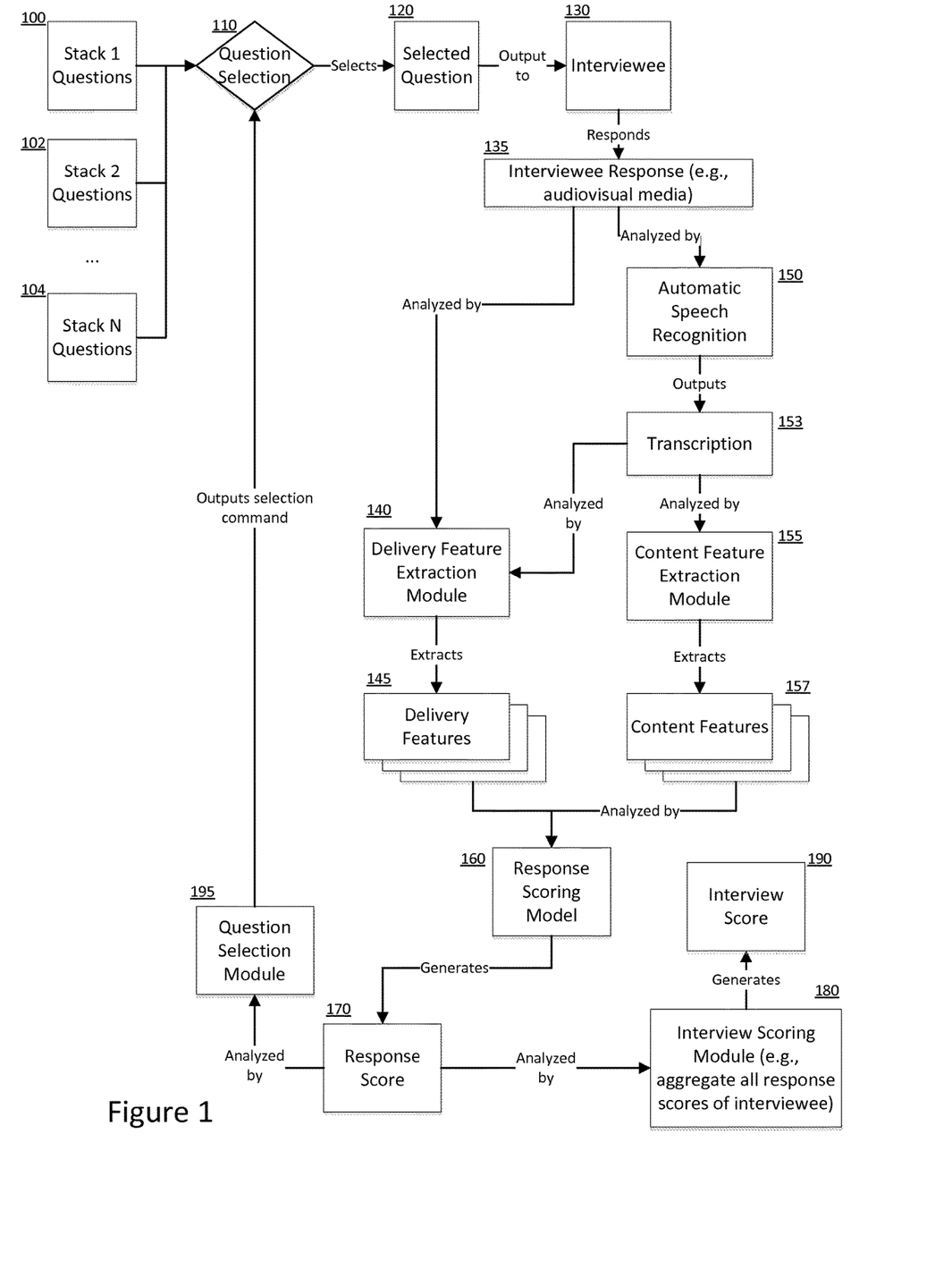
FIG. 1 is a block diagram depicting various aspects of an interview evaluation engine for evaluating interviews.

FIG. 1 is a block diagram depicting various aspects of an interview evaluation engine for evaluating interviews, which may be implemented using a suitable computer processing system, such as one or computer processing systems (e.g., central processing units—CPUs) located in one or more computers that may communicate with one another. In some embodiments, evaluating an interview includes providing a quantitative characterization, such as a score, for behavioral dimensions based on a candidate's performance in a structured interview that consists of one or more questions.

In some embodiments, the interview questions may be classified into N stacks (e.g., 100, 102, 104) in a database, where each stack contains different questions (or a single question) that are psychometrically equivalent. The stacks may optionally be classified into and ordered along a behavioral dimension and administered in that order (e.g., may be presented by a computer processing system from a queue). Alternatively, questions may be adaptively selected and administered based on how previous questions are answered. For example, if the scoring engine described below determines that a candidate had a certainly level of pauses or silence in a response, suggesting difficulty answering, the processing system could automatically select additional questioning on that topic. Alternatively, the human interviewer facilitating interview may select further questions based on the interviewer's own perception of how a given question was answered. The questions may be predetermined, and the audio/audiovisual output generated from the questions may be pre-recorded or synthesized.

An interview may consist of one or more questions, and in some embodiments the questions may be selected 110 from N stacks (e.g., 100, 102, 104). Question selection 110 may be based on any criteria. For example, an interview may require m questions to be selected 110 from m different question stacks (e.g., 100, 102, 104), and each question 120 may be selected 110 randomly from its corresponding stack. In some embodiments, the order in which questions are administered may be predetermined. For example, the ordering of the question stacks (e.g., 100, 102, 104) may reflect the desired sequence of question types, in which case questions may be selected 110 and administered from the stacks in that stacks' ordering. In another embodiment, questions may be selected 110 adaptively/dynamically based on the interviewee's previous response(s). For example, during an interview, a question selection module 195 may analyze an interviewee's response score(s) 170 thus far (a response score corresponds to a quantitative evaluation of the interviewee's response to a question, as will be described in detail below) and accordingly output a question selection command that would influence which question is selected next 110. For example, if the interviewee received unfavorable scores (e.g., as compared to a predetermined threshold score) on questions related to past job experiences, the question selection module 195 may dictate that additional questions related to job experience, education experience, or other probatively related fields be asked. If the question selection module 195 determines that a particular topic has been sufficiently covered (e.g., more than x number of administered questions have been directed to that topic), it may determine the next logical question to ask based on, e.g., a predetermined question sequence or outline. In one implementation, an output from the question selection module 195 may correspond to a question category (e.g., a question stack number).

The selected question 120 may be presented to the interviewee 130 via any suitable means. For example, the question may be displayed in text form on a display screen, output in audio format through a speaker (e.g., either from a pre-recording or via speech synthesis), output in audiovisual format on a display screen (e.g., a pre-recorded video of a human presenting the question), or read by a human (e.g., live and in person). The interviewee 130, having discerned the question 120, may respond 135. In some embodiments the interviewee response may be recorded (e.g., using audiovisual capturing equipment, such as one or more digital video capturing devices).

Multimodal features from the interviewee's response 135 may then be extracted and processed by a computer processing system. In some embodiments, the features extracted could be generally classified as either delivery features or content features. Delivery features may include both verbal delivery features and non-verbal delivery features Verbal delivery features may include, but not limited to, prosody, disfluencies (e.g., usage of filler words such as "ah" or "um"), word choice, grammar, speech rate, tone, etc. Non-verbal delivery features may include, but not limited to, body language, facial expression, and/or the like that provides cues for the interviewee's personality, attentiveness, mood, agreeableness, extraversion, conscientiousness, neuroticism, openness to experience, and/or the like. For example, leaning forward and maintaining forward eye gaze may be positive cues (e.g., indicative of attentiveness and/or confidence), whereas fidgeting and nail biting may be negative cues (e.g., indicative of nervousness and/or lack of confidence).

Non-verbal delivery features 145 may be extracted using a variety of technologies. A delivery feature extraction module 140 of a computer processing system may evaluate the interviewee response 135 based on the corresponding audiovisual recording and/or augmented data, such as time-stamped log of the recording or Kinect gesture data. For example, in one implementation the delivery feature extraction module 140 may utilize technology developed by, e.g., Emotient (www.emotient.com), to automatically measure the interviewee's 130 attention, engagement, and emotion based on the video recording of the interviewee response 135. As another example, delivery feature extraction module 140 may also utilize FaceTrack, developed by Visage Technologies (www.visagetechnologies.com), to track the interviewee's 130 facial features, including eye gaze direction. The delivery feature extraction module 140 may also utilize movement/gesture recognition technology, such as Microsoft's Kinect, to detect and identify body movement, such as described for example in U.S. Pat. No. 7,974,443 and U.S.

Patent Publication No. 2010/0199228, the entire contents of each of which are incorporated herein by reference. The extracted non-verbal delivery features 145 may be represented by numerical values, vectors of values, etc. For example, an emotion feature 145 may be represented by a vector of values, each value representing a confidence measure (e.g., in percentage point) for a primary emotion. For instance, an emotion vector may include five values that correspond to five emotions (e.g., happiness, anger, fear, guilt, sadness). Thus, an exemplary vector of {0.51, 0.27, 0.05, 0, 0.13} may indicate that the emotion detector is 51% confident that the happiness is detected, 27% confident that anger is detected, 5% confident that fear is detected, and so on. As another example, an eye gaze feature 145 may include a single numerical value representing the angle (in degrees) of the interviewee's 130 gaze relative to the horizontal line of sight or to the camera. Other examples of non-verbal delivery features 145 may include, e.g., binary values representing whether fidgeting is detected, whether the interviewee's hands are above or below the table, whether the interviewee is leaning forward or backwards, etc.

The delivery feature extraction module 140 may also utilize a variety of technologies to extract verbal delivery features 145. For example, to extract prosodic features 145, the delivery feature extraction module 140 may implement the teachings of Educational Testing Service's U.S. Patent Publication 2012/0245942, "Computer-Implemented Systems and Methods for Evaluating Prosodic Features of Speech," which is hereby incorporated by reference in its entirety. If a transcription of the recording 135 is needed, automatic speech recognition technology 150 may be used to analyze the interviewee response 135 and generate a corresponding transcription 153. The transcription 153 may be analyzed to identify, e.g., speech disfluencies (e.g., excessive use of filler words, such as "like," "you know," "um," etc.). A numerical value, a vector of numerical values, and/or the like may represent each the extracted verbal delivery features 145.

In addition to delivery features, the system would also extract content features 157 from the interviewee response 135. Content features 157 may include, but not limited to, responsiveness to the question asked, thoroughness of the response, and other content-related measures. In some embodiments, content features 157 may be extracted using a content feature extraction module 155. For example, the interviewee's response 135 to the selected question 120 may be compared to model responses to the same question 120. In one implementation, the interviewee response 135 may be analyzed using automatic speech recognition technology 150 to extract a corresponding transcription 153. The content feature extraction module 155 may then compare the transcription 153 to a set of model responses. Comparisons may be utilized, e.g., content vector analysis, semantic distances, and/or other methods of measuring content relevance. Results from the comparisons may then be used to generate a numerical feature score 157 for content relevance. In one implementation, the feature score 157 may be determined based on predetermined rubrics. For example, model responses to a question probing for leadership traits may be classified into three hierarchical classes: high (e.g., proactively takes on leadership responsibilities; helps, mentors, teaches, or cross-train co-workers; etc.), medium (e.g., assumes leadership responsibilities when asked or required to; delegates tasks or duties; etc.), and low (e.g., attempts to discipline co-workers of the same rank; assumes authority through aggression or intimidation; etc.). If the interviewee's 120 response transcription 153 closely matches responses in the "high" category, a corresponding content feature score 157 would be assigned.

In another example, topic models may be used to determine content relevance. In one implementation, a collection of responses to the selected question 120 may be analyzed using Latent Dirichlet Allocation (LDA) or Latent Semantic Analysis (LSA) to derive k topic models. By comparing the topic models to a set of model/ideal responses, the system may identify which of the topic models are likely predictive of desired responses. The system may then apply those selected topic models to the transcription 153 to generate a content feature value 157. As another example, transcriptions with predetermined scores may be analyzed using LDA or LSA to generate k topic models. The topic models that correspond to transcriptions with high scores may be compared to the incoming transcription 153 to obtain similarity metrics. In some implementations, similarity metrics indicating a short distance between the incoming transcription 153 and the selected topic models suggest that the incoming transcription 153 would likely receive a high score based on its content. Thus, the similarity metrics represent a content relevance measurement and could be used to generate a content feature value 157.

Once the delivery features 145 and content features 157 have been extracted, they may be analyzed by a response scoring model 160 and transformed into a response score 170. As will be described in more detail below, the response scoring model 160 may be represented by, e.g., any mathematical framework, such as a linear combination of weighted features, a random forest, and/or the like. The response scoring model 160 may transform the delivery features 145 and content features 157 into a response score 170, which represents a quantitative measure of how well the interviewee 120 responded to the selected question 120. Unlike conventional scoring models, the response scoring model 160 takes into account both delivery features 145 and content features 157 of the interviewee response 135, and therefore more accurately reflects the evaluation process of a human evaluator. As described above, the response score 170 and previous response scores assigned to the interviewee's 120 may be used to adaptively select 110 the next question for the interviewee 120.

When the interview concludes (i.e., no more questions need to be asked), in some embodiments an interview scoring module 180 may analyze each of the response scores 170 assigned to the interviewee 120 to generate an interview score 190. The interview score 190 may be an aggregation of the response scores 170 (e.g., by summing, averaging, etc.). As described above, the individual response scores 170 and/or interview score 190 may be used to determine the interviewee's 120 performance, which may assist the interviewer (e.g., employer, school, etc.) in determining whether to hire, admit, promote, etc. the interviewee 120.

Figure 2:
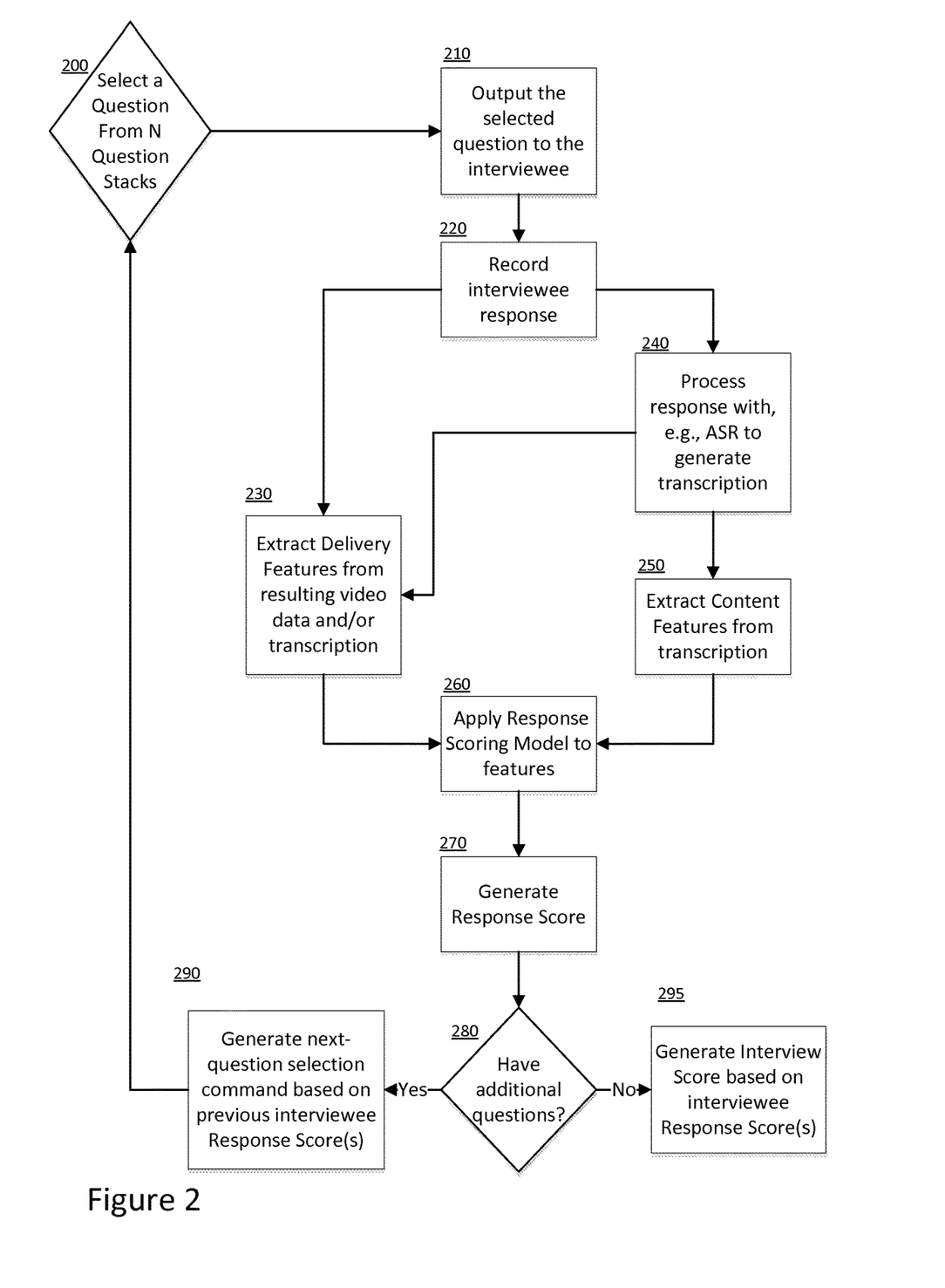
FIG. 2 is a flow diagram depicting a computer-implemented method of evaluating interviews.

FIG. 2 is a flow diagram depicting a computer-implemented method of evaluating interviews. In one embodiment, a processing system implementing the method may select 200 a question from N question stacks. As described above, questions may be selected in a predetermined fashion (e.g., one question from each stack, in order of the stacks). Alternatively, question stacks may be chosen in an adaptive fashion, thereby tailoring the interview questions to an individual interviewee as a function of how he/she responds to one or more of the previously administered questions. The adaptive administration of questions requires each response to be scored on the fly quickly enough so that the following question may be selected appropriately.

The selected question may be administered 210 to the interviewee in any conventional way, such as via a display screen, speakers, or by a human (e.g., reading the selected question to the interviewee). The interviewee's response to the administered question may in some embodiments be recorded 220 (e.g., in any conventional audiovisual format, such as MPEG4).

The interviewee response may then be analyzed using a series of multimodal evaluation technologies to extract both delivery features 230 and content features 250 of interest. For example, non-verbal delivery features such as the interviewee's emotions may be extracted 230 from facial expressions shown in the video feed of the interviewee response, as detailed above. Verbal delivery features, such as prosody and disfluencies, may also be extracted 230 from the interviewee response 220 or a corresponding transcription 240 of the response 220. By using natural language processing and conventional content-relevance measures, as described above, content features 250 may further be extracted from the recorded interviewee response 220 and/or its corresponding transcription 240 (e.g., generated from automated speech recognition technology). Then, a response scoring model may be applied 260 to the extracted delivery features and content features, which transforms the feature values into a response score 270. If the interview requires additional questions to be administered 280 (at Yes), the instant response score and/or previously assigned response scores may be analyzed to adaptively determine which follow-up question should be asked. On the other hand, if the interview requires no additional questions 280 (at No), then an interview score may be generated 295 based on all or a subset of the response scores assigned to the interviewee. The interview score and/or the response scores may be used by the interviewer to make hiring/admission/etc. decisions.

Figure 3:
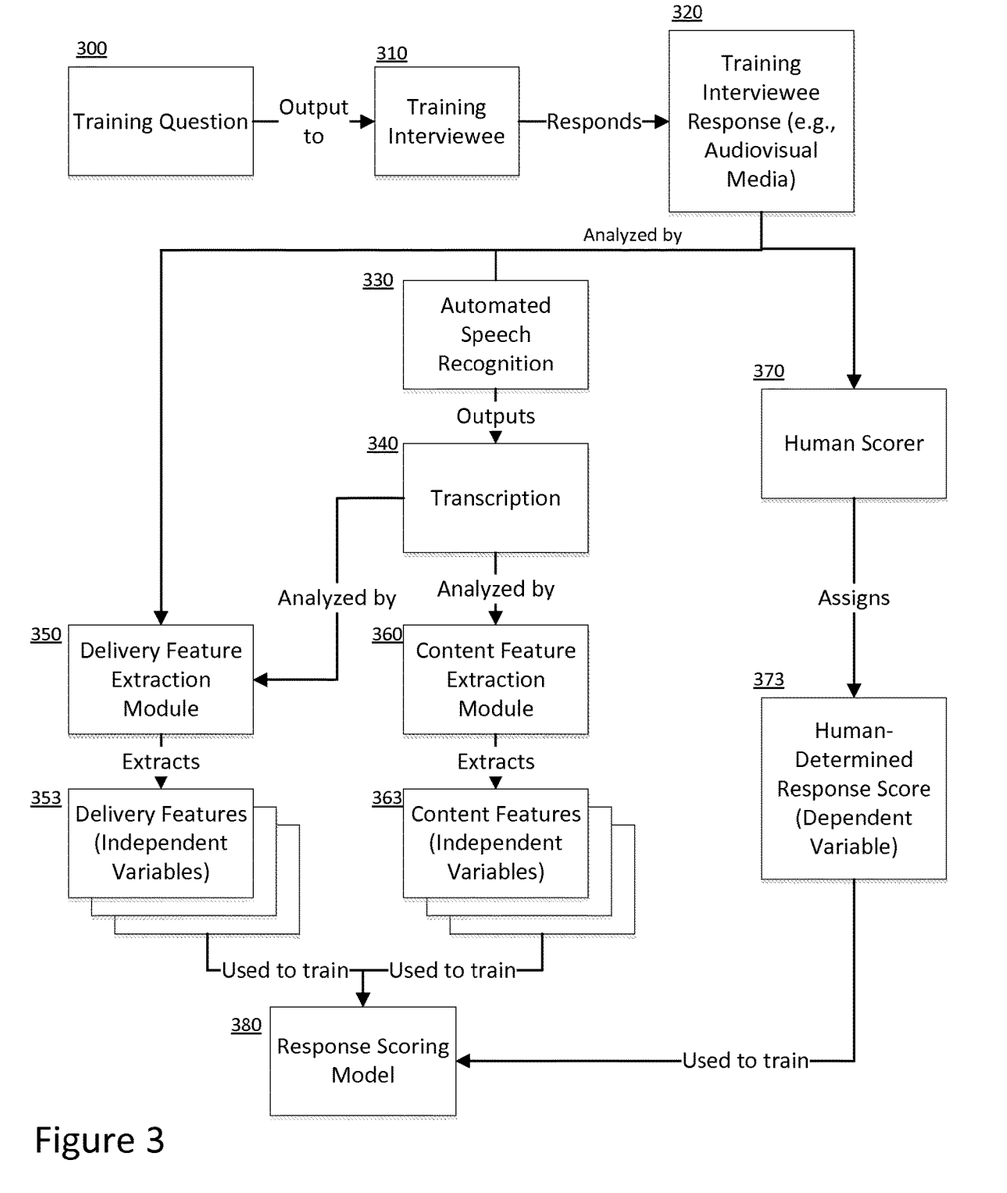
FIG. 3 is a block diagram depicting various aspects of an interview evaluation engine for generating a response scoring model.

FIG. 3 is a block diagram depicting various aspects of an interview evaluation engine for generating a response scoring model. In one embodiment, supervised machine learning may be used to train the response scoring model 380. A collection of training questions may each 300 be administered to a training interviewee 310. The training interviewee 310 may respond to a training question 300, and an audiovisual response 320 may be recorded. The audiovisual response 320 may, depending on need, be analyzed using automated speech recognition 330 to derive a corresponding transcription 340.

The interviewee response 320 and/or the corresponding transcription 340 may then be analyzed. As described above, a delivery feature extraction module 350 may analyze the interviewee response 320 and/or the transcription 340 to extract one or more delivery features 353. Again, the delivery features 353 may include both verbal and non-verbal delivery features (e.g., numerical representations for body language, mood, facial expression, prosody, speech rate, disfluencies, etc.). Also as described above, a content feature extraction module 360 may analyze the transcription 340 to extract one or more content features 363 (e.g., measures of content relevance, comparisons to model responses, etc.). In addition, the interviewee's response 320 may be analyzed by a human scorer 370, who would assign a human-determined response score 373 to the response 320.

The extracted delivery features 353, content features 363, and human-determined response score 373 may then be used to train a response scoring model 380 for predicting interview performances. The response scoring model 380 may be represented by any mathematical framework, such as linear combination, logistic regression model, random forest prediction model, etc. For example, if using linear combination, the response scoring model 380 may be represented as:

$$S = d_1 \cdot D_1 - d_2 \cdot D_2 + \ldots + d_i \cdot D_i + c_1 \cdot C_1 + c_2 \cdot C_2 + \ldots + c_j \cdot C_j,$$

where dependent variable S represents a response score, independent variables $D_1$ to $D_i$ represent delivery features, coefficients $d_1$ to $d_i$ represent weights for the delivery features, independent variables $C_1$ to $C_j$ represent content features, and coefficients $c_1$ to $c_j$ represent weights for the content features. During model training, the extracted delivery features 353, extracted content features 363, and human-determined response score 373 associated with the same training interviewee response 320 would form a data set. The extracted delivery features 353 would replace the independent variables $D_1$ to $D_i$, the extracted content features 363 would replace the independent variables $C_1$ to $C_j$, and the human-determined response score 373 would replace the dependent variable S. Additional data sets may similarly be generated based on additional training questions 300 and training interviewee responses 320. Once a sufficient number of data sets have been generated, the response scoring model 380 may be trained using well-known statistical learning methods, such as linear regression, logistic regression, classification methods, etc. Referring again to the linear combination example above, linear regression may be used to determine values for the aforementioned coefficients $d_1$ to $d_i$ and $c_1$ to $c_j$. The coefficient values may then replace the coefficient variables in the response scoring model 380, thereby configuring the model to predict interview response scores. Such coefficients determined from the training thereby provide weights to the various feature variables such that the trained model comprises a plurality of weighted feature variables that may be applied to responses to be scored.

Figure 4:
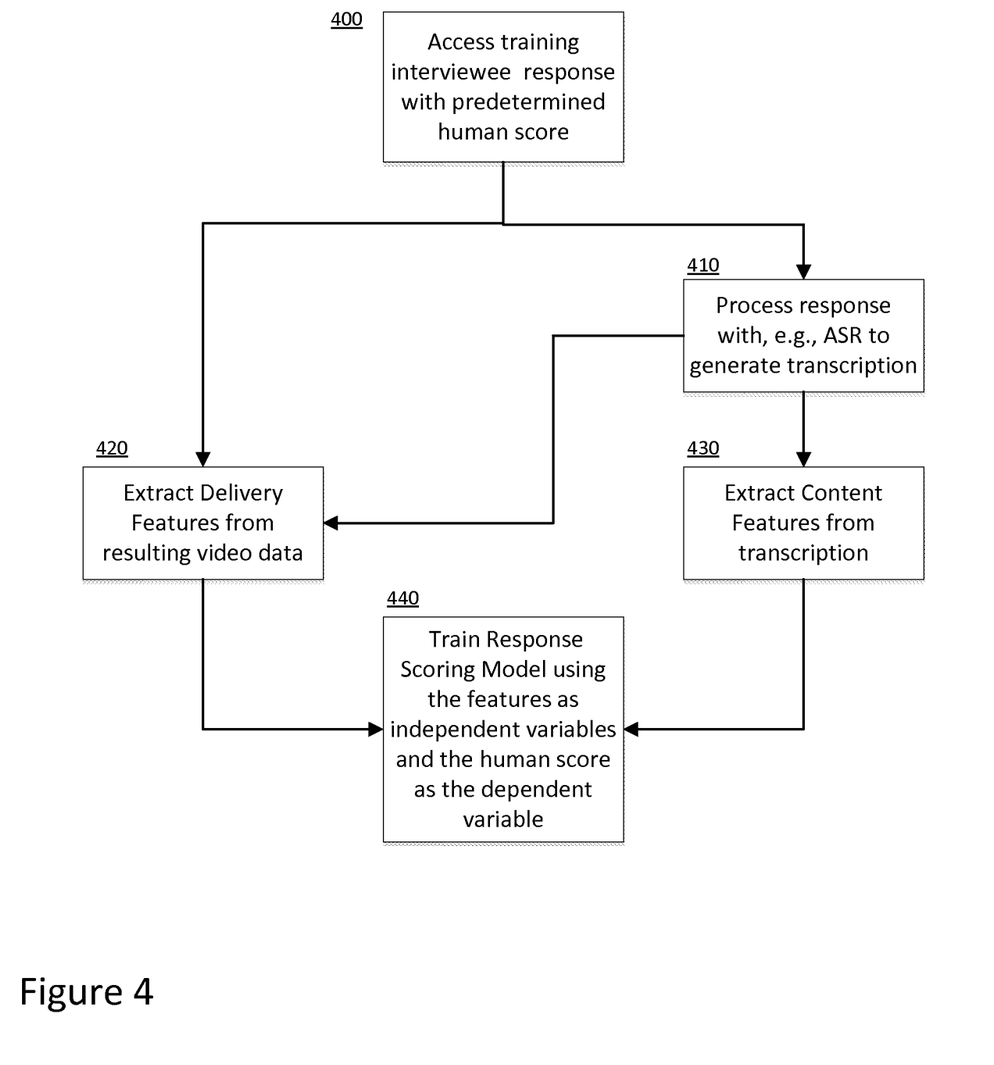
FIG. 4 is a flow diagram depicting a computer-implemented method of generating a response scoring model.

FIG. 4 is a flow diagram depicting a computer-implemented method of generating a response scoring model. In one embodiment, a processing system may access training interview responses from a data source 400. Each of the training interview responses may have an associated human-determined score that reflects a human scorer's evaluation of the training interview response. If a transcription is needed, the system may use, e.g., automated speech recognition technology 410 to process the training interview response and generate a corresponding transcription. In other implementations, the transcription may be pre-generated, in which case the system may access the transcription from a data source. As described above, the processing system may analyze the training interview response and/or the transcription to extract delivery features 420. Also as described above, the processing system may analyze the transcription to extract content features 430. The delivery features, content features, and predetermine human score may be used to train a response scoring model 440, as described above. The delivery features and content features may replace the response scoring model's independent variables, and the predetermined human score may replace the response scoring model's dependent variable. Based on several such data sets (i.e., delivery features, content features, and predetermined human score) from a collection of training interview responses, regression analysis or other suitable machine learning algorithms may be used to train the response scoring model. The coefficient values resulting from the training may then be used to configure the response scoring model to predict response scores for interview responses.

The response scoring model thus generated may facilitate a more rapid, standardized, and cost-effective means for evaluating video-based interviews to make selection and/or development decisions. The response scoring model has the ability to automatically evaluate video-based interview data and produce quantitative measures indicative of an interviewee's performance/competency in particular behavior dimensions. This ability either reduces or eliminates the need for human judges to interview and evaluate candidates. One of ordinary skill in the art would appreciate that by training the response scoring model using both delivery features and content features, a more accurate predictive model would result compared to models trained on either delivery features or content features alone. This is because human interviewers take both delivery features and content features into consideration when arriving at an evaluation, and thus training a model using both types of features would result in a response scoring model that more accurately mimics the decision process of human reviewers. Advantageously, machine-based scoring models do not suffer from the same problems as human reviewers, such as lack of consistency, inherent biases, speed, scalability, among others. The computerized approaches for scoring a candidate's response or performance described herein, which utilize, e.g., various computer models trained according to sample data, are very different from conventional human scoring of a candidate's response. In conventional human scoring of a candidate response, a human grader observes the performance and makes a holistic, mental judgment about its proficiency and assigns a score. Conventional human grading of such responses does not involve the use of the computer models, associated variables, training of the models based on sample data to calculate weights of various features or variables, transforming observed data based on such models, representing such processed data with suitable data structures, and applying the computer models to such data structures to score the performance, as described herein. Moreover, conventional human scoring may suffer from inconsistency in scoring from one human scorer to another, and/or may suffer from inconsistency in scoring even with the same human scorer from one day to the next. The approaches described herein may not suffer from such deficiencies.

Figure 5A:
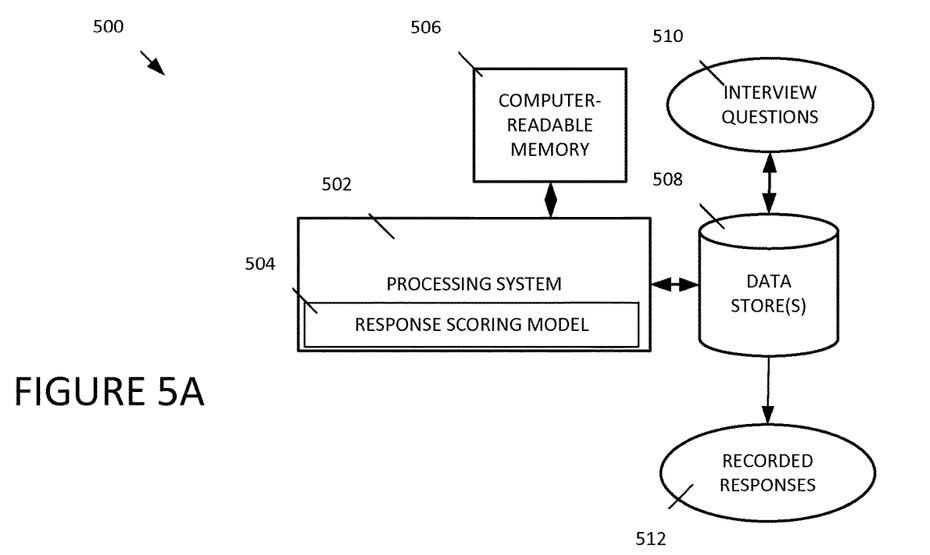
FIGS. 5A, 5B, and 5C depict example systems for use in implementing a system for evaluating interviews.
Figure 5B:
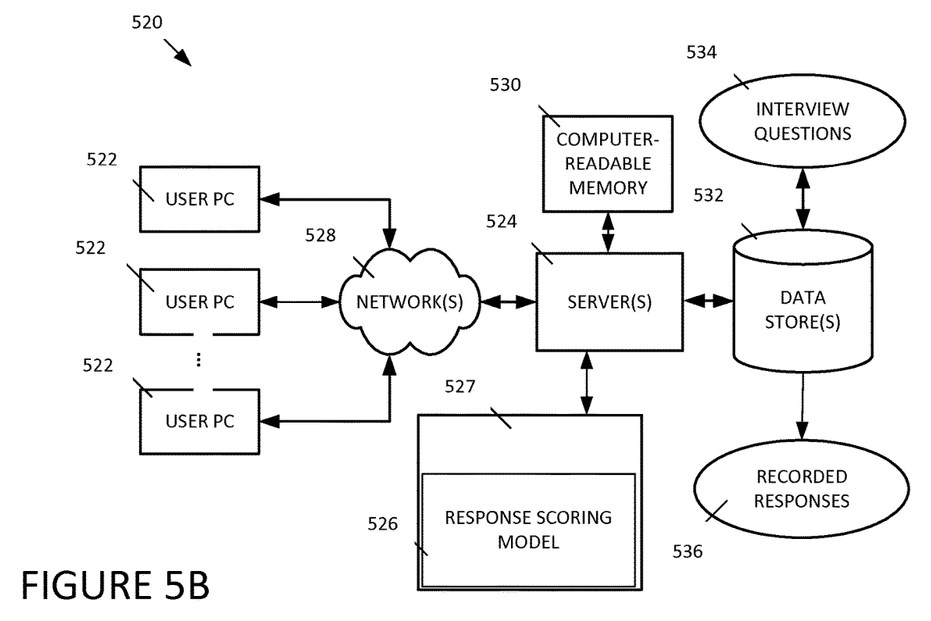
Figure 5C:
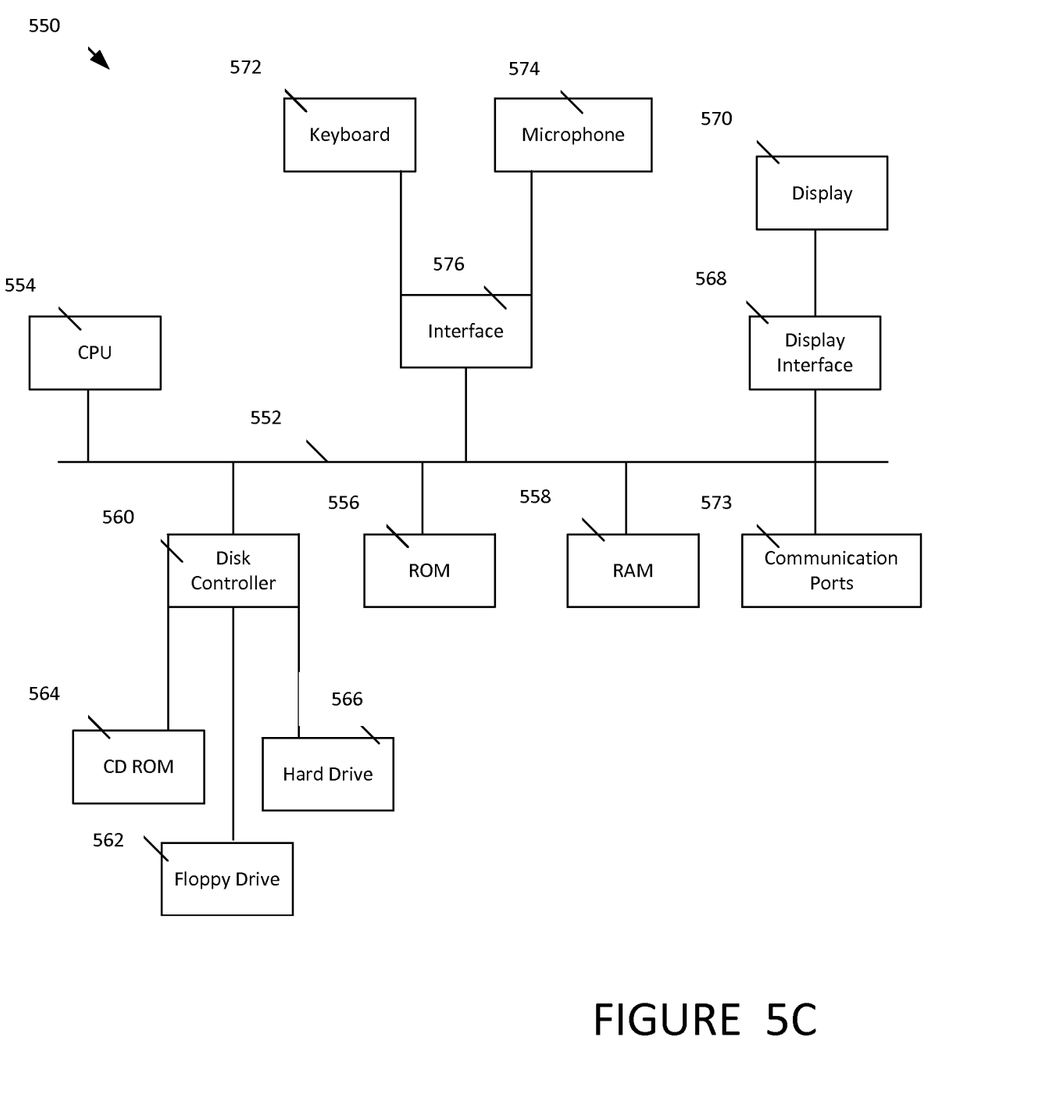

Additional examples will now be described with regard to additional exemplary aspects of implementation of the approaches described herein. FIGS. 5A, 5B, and 5C depict example systems for use in implementing a system for evaluating interview responses. For example, FIG. 5A depicts an exemplary system 500 that includes a standalone computer architecture where a processing system 502 (e.g., one or more computer processors located in a given computer or in multiple computers that may be separate and distinct from one another) includes a response scoring model 504 being executed on it. The processing system 502 has access to a computer-readable memory 506 in addition to one or more data stores/data sources 508. The one or more data stores 508 may include interview questions 510 as well as recorded responses 512.

FIG. 5B depicts a system 520 that includes a client server architecture. One or more user PCs 522 access one or more servers 524 running a response scoring model generator 526 on a processing system 527 via one or more networks 528. The one or more servers 524 may access a computer readable memory 530 as well as one or more data stores 532. The one or more data stores 532 may contain interview questions 534 as well as recorded responses 536.

FIG. 5C shows a block diagram of exemplary hardware for standalone computer architecture 550, such as the architecture depicted in FIG. 10A that may be used to contain and/or implement the program instructions of system embodiments of the present invention. A bus 552 may serve as the information highway interconnecting the other illustrated components of the hardware. A processing system 554 labeled CPU (central processing unit) (e.g., one or more computer processors at a given computer or at multiple computers), may perform calculations and logic operations required to execute a program. A non-transitory processor-readable storage medium, such as read only memory (ROM) 556 and random access memory (RAM) 558, may be in communication with the processing system 554 and may contain one or more programming instructions for performing the method of implementing a response scoring model. Optionally, program instructions may be stored on a non-transitory computer readable storage medium such as a magnetic disk, optical disk, recordable memory device, flash memory, or other physical storage medium.

A disk controller 560 interfaces one or more optional disk drives to the system bus 552. These disk drives may be external or internal floppy disk drives such as 562, external or internal CD-ROM, CD-R, CD-RW or DVD drives such as 564, or external or internal hard drives 566. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 560, the ROM 556 and/or the RAM 558. Preferably, the processor 554 may access each component as required.

A display interface 568 may permit information from the bus 552 to be displayed on a display 570 in audio, graphic, or alphanumeric format. Communication with external devices may optionally occur using various communication ports 573.

In addition to the standard computer-type components, the hardware may also include data input devices, such as a keyboard 572, or other input device 574, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Further, as used in the description herein and throughout the claims that follow, the meaning of "each" does not require "each and every" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method of generating a model for scoring interview responses, comprising:
    accessing, with a processing system, a training response, the training response being an audiovisual recording of a person responding to an interview question administered via a display screen or speakers;
    accessing, with the processing system, a human-determined score assigned to the training response;
    extracting, with the processing system and using a series of multimodal evaluations, at least one delivery feature from the audiovisual recording of the training response, wherein the at least one delivery feature relates to one of: eye gaze, emotion, facial expression, posture, gesture, and sitting position;
    obtaining, with the processing system, a transcription of the training response, the transcription being generated using automated speech recognition;
    extracting, with the processing system and using the series of multimodal evaluations, at least one content feature from the transcription;
    training, with the processing system, a response scoring model for scoring interview responses using at least the delivery feature, the content feature, and the human-determined score; and
    configuring the response scoring model based on the training, the configured response scoring model being configured to automatically assign scores to audiovisual recordings of interview responses, the scores being used for candidacy assessment.

2. The computer-implemented method of claim 1, wherein extracting the at least one content feature includes: classifying, with the processing system, the training response according to a predetermined rubric.

3. The computer-implemented method of claim 1, wherein the at least one content feature and the at least one delivery feature represent independent variables in the response scoring model, and wherein human-determined score represent a dependent variable in the response scoring model.

4. The computer-implemented method of claim 1, wherein the training of the response scoring model includes using statistical learning.

5. The computer-implemented method of claim 1, wherein the at least one delivery feature comprises at least six verbal delivery features and at least two non-verbal delivery features, at least six verbal delivery features comprising a prosody feature, a disfluence feature, a word choice feature, a grammar feature, a speech rate feature, a rate feature and a tone feature, and at least two non-verbal delivery features comprising a body language feature and a facial expression feature.

6. The computer-implemented method of claim 5, wherein the at least two non-verbal delivery features are extracted based on the audiovisual recording and a time-stamped log of the audiovisual recording.

7. The computer-implemented method of claim 5, wherein the at least six verbal delivery features are represented by a vector of numerical values.

8. The computer-implemented method of claim 1, wherein the at least one content feature comprises a responsiveness to the interview question and a thoroughness of the training response.

9. The computer-implemented method of claim 8, wherein the at least one content feature is based on a content relevance determined by a comparison of the training response and a model response.

10. The computer-implemented method of claim 9, wherein the content relevance is determined using topic models.

11. The computer-implemented method of claim 1, further comprising, after the extracting the at least one delivery feature and the at least one content feature, but before the training the response scoring model,
    determining, based on the at least one delivery feature and on the at least one content feature, whether an additional interview question should be administered; and
    adaptively selecting the additional interview question if it is determined that the additional interview question should be administered.

12. A computer-implemented method of scoring interview responses, comprising:
    accessing, with a processing system, an interview response, the interview response being an audiovisual recording of a candidate responding to an interview question administered via a display screen or speakers;
    accessing, with the processing system, a human-determined score assigned to the interview response;
    extracting, with the processing system and using a series of multimodal evaluations, at least one delivery feature from the audiovisual recording of the interview response, wherein the at least one delivery feature relates to one of: eye gaze, emotion, facial expression, posture, gesture, and sitting position;
    obtaining, with the processing system, a transcription of the interview response, the transcription being generated using automated speech recognition;
    extracting, with the processing system and using the series of multimodal evaluations, at least one content feature from the transcription;
    applying, with the processing system, a response scoring model to the delivery feature, the content feature, and the human-determined score; and
    generating, with the processing system, a response score based on the applying of the response scoring model, the response score corresponding to the interview response;

wherein the response score is used for assessing the candidate.

13. The computer-implemented method of claim 12, wherein extracting the at least one content feature includes: classifying, with the processing system, the interview response according to a predetermined rubric.

14. The computer-implemented method of claim 12, further comprising:
generating, with the processing system, additional response scores using the response scoring model, the addition response scores correspond to additional interview responses by the candidate to additional interview questions; and
aggregating, with the processing system, the response score and the additional response scores to generate an interview score;
wherein the interview score is used for assessing the candidate.

15. The computer-implemented method of claim 14, wherein the additional interview questions include a first question and a second question, wherein the first question is presented to the candidate before the second question, wherein the second question is selected by the processing system based on at least the additional response score associated with the first question.

16. A system for generating a model for scoring interview responses, comprising:
a processing system; and
a memory;
wherein the processing system is configured to execute steps comprising:
accessing a training response, the training response being an audiovisual recording of a person responding to an interview question administered via a display screen or speakers;
accessing a human-determined score assigned to the training response;
extracting, using the series of multimodal evaluations, at least one delivery feature from the audiovisual recording of the training response, wherein the at least one delivery feature relates to one of: eye gaze, emotion, facial expression, posture, gesture, and sitting position;
obtaining a transcription of the training response, the transcription being generated using automated speech recognition;
extracting, using the series of multimodal evaluations, at least one content feature from the transcription;
training a response scoring model for scoring interview responses using at least the delivery feature, the content feature, and the human-determined score; and
configuring the response scoring model based on the training, the configured response scoring model being configured to automatically assign scores to audiovisual recordings of interview responses, the scores being used for candidacy assessment.

17. A system for scoring interview responses, comprising:
a processing system; and
a memory;
wherein the processing system is configured to execute steps comprising:
accessing an interview response, the interview response being an audiovisual recording of a candidate responding to an interview question administered via a display screen or speakers;
accessing a human-determined score assigned to the interview response;
extracting, using a series of multimodal evaluations, at least one delivery feature from the audiovisual recording of the interview response, wherein the at least one delivery feature relates to one of: eye gaze, emotion, facial expression, posture, gesture, and sitting position;
obtaining a transcription of the interview response, the transcription being generated using automated speech recognition;
extracting, using the series of multimodal evaluations, at least one content feature from the transcription;
applying a response scoring model to the delivery feature, the content feature, and the human-determined score; and
generating a response score based on the applying of the response scoring model, the response score corresponding to the interview response;
wherein the response score is used for assessing the candidate.

18. The system of claim 17, wherein the processing system is configured to execute steps comprising:
generating additional response scores using the response scoring model, the addition response scores correspond to additional interview responses by the candidate to additional interview questions; and
aggregating the response score and the additional response scores to generate an interview score;
wherein the interview score is used for assessing the candidate.

19. The system of claim 18, wherein the additional interview questions include a first question and a second question, wherein the first question is presented to the candidate before the second question, wherein the second question is selected by the processing system based on at least the additional response score associated with the first question.

20. A non-transitory computer-readable medium for generating a model for scoring interview responses, comprising instructions which when executed cause a processing system to carry out steps comprising:
accessing a training response, the training response being an audiovisual recording of a person responding to an interview question administered via a display screen or speakers;
accessing a human-determined score assigned to the training response;
extracting, using a series of multimodal evaluations, at least one delivery feature from the audiovisual recording of the training response, wherein the at least one delivery feature relates to one of: eye gaze, emotion, facial expression, posture, gesture, and sitting position;
obtaining a transcription of the training response, the transcription being generated using automated speech recognition;
extracting, using the series of multimodal evaluations, at least one content feature from the transcription;
training a response scoring model for scoring interview responses using at least the delivery feature, the content feature, and the human-determined score; and
configuring the response scoring model based on the training, the configured response scoring model being configured to automatically assign scores to audiovisual recordings of interview responses, the scores being used for candidacy assessment.

21. A non-transitory computer-readable medium for scoring interview responses, comprising instructions which when executed cause a processing system to carry out steps comprising:

accessing an interview response, the interview response being an audiovisual recording of a candidate responding to an interview question administered via a display screen or speakers;

accessing a human-determined score assigned to the interview response;

extracting, using a series of multimodal evaluations, at least one delivery feature from the audiovisual recording of the interview response, wherein the at least one delivery feature relates to one of: eye gaze, emotion, facial expression, posture, gesture, and sitting position;

obtaining a transcription of the interview response, the transcription being generated using automated speech recognition;

extracting, using the series of multimodal evaluations, at least one content feature from the transcription;

applying a response scoring model to the delivery feature, the content feature, and the human-determined score; and     generating a response score based on the applying of the response scoring model, the response score corresponding to the interview response;

wherein the response score is used for assessing the candidate.

22. The non-transitory computer-readable medium of claim 21, further comprising instructions for causing the processing system to execute steps, including:

generating additional response scores using the response scoring model, the addition response scores correspond to additional interview responses by the candidate to additional interview questions; and     aggregating the response score and the additional response scores to generate an interview score;

wherein the interview score is used for assessing the candidate.

23. The non-transitory computer-readable medium of claim 22, wherein the additional interview questions include a first question and a second question, wherein the first question is presented to the candidate before the second question, wherein the second question is selected by the processing system based on at least the additional response score associated with the first question.

* * * * *